UNITED STATES PATENT OFFICE.

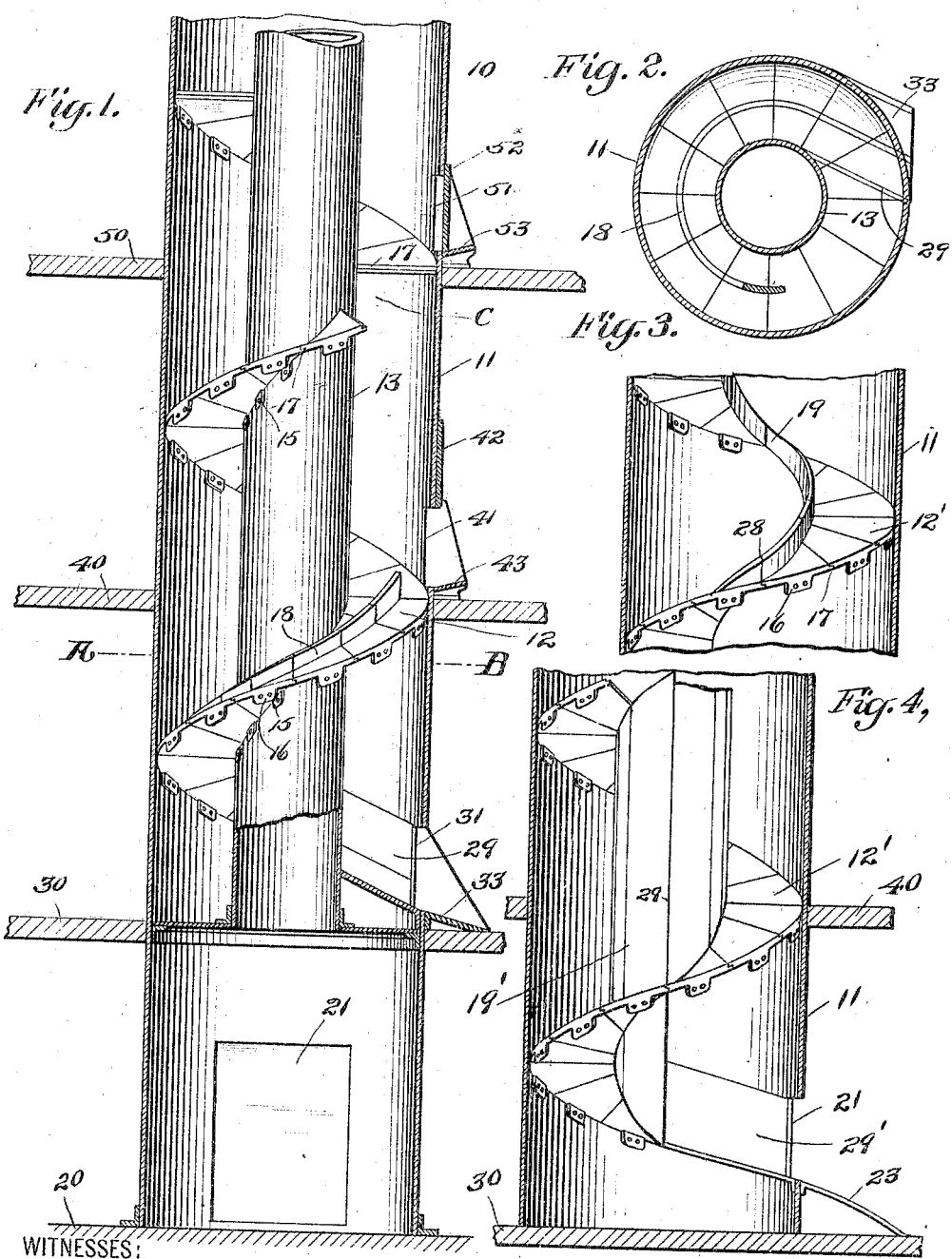

MARTIN C. SCHWAB, OF BALTIMORE, MARYLAND, ASSIGNOR TO GRAVITY CONVEYOR COMPANY, A CORPORATION OF NEW YORK.

GRAVITY-CONVEYER.

No. 817,278.　　　Specification of Letters Patent.　　　Patented April 10, 1906.

Application filed May 29, 1905. Serial No. 262,834.

*To all whom it may concern:*

Be it known that I, MARTIN C. SCHWAB, a citizen of the United States, residing at Baltimore, in the State of Maryland, have invented a certain new and useful Improvement in Gravity-Conveyers, of which the following is a specification.

My invention relates to chutes for conveying articles from a higher to a lower elevation by gravity and in which the movement of the article is retarded in its descent.

The main object of my invention is to simplify and improve the construction of gravity-conveyers.

Other objects will appear hereinafter, the novel combinations of parts being set forth in the claims.

Referring to the drawings, Figure 1 shows a sectional elevation of a spiral chute. Fig. 2 is a sectional plan view of Fig. 1 on the line A B. Fig. 3 is a modification of Fig. 1, and Fig. 4 is a modification of Fig. 3 in that the interior wall or flange is extended to form an inner core for the conveyer.

10 designates the conveyer in general and comprises an outer shell 11, an inner core 13, and an interposed spiral blade made up of plates 12.

30, 40, and 50 designate different floors of a building, which are connected by the conveyer.

31, 41, and 51 are openings in the outer shell 11, said openings affording communication between the various floors of the building and the chute. 42 and 52 are doors arranged to close these openings when they are not in use. The door 42 is shown in its raised or open position, while the door 52 is shown in its closed position. The openings 41 and 51 are preferably above the spiral surface adjoining the openings, so that they will not interfere with the passage of parcels by them in the chute. The intake-openings 41 and 51 are provided with inclined shelves 43 and 53 for facilitating the placing of packages into the conveyer. At the exit-opening 31 is a guide 29, (shown best in Fig. 2,) tangentially joining the core 13 and extending to the outer shell 11. The inclined platform 33 is attached to the lower end of the spiral blade to form an extension thereof and is for the purpose of conveying the packages to the floor 30.

If desired, the outer shell 11 may be carried down below the lower end of the spiral, as shown in Fig. 1. The outer shell is here shown extending to the basement 20 of the building. An opening 21 may be provided for the chamber thus formed.

To increase the efficiency of the conveyer, I divide the spiral surface into two parts by means of the vertical rib or flange 18 intermediate the outer shell and the inner core. There are thus formed two parallel paths, so that articles of different character may be transmitted through the chute at the same time. The lower part of Fig. 1 shows the spiral blade made of a plurality of plates having the ribs 18; but a single spiral blade may also be provided with a vertical rib, if desired. Furthermore, the inclined platform 33 may also be provided with a vertical separating-rib.

In order to greatly simplify the manufacture of spiral gravity-conveyers and lessen the cost of constructing them, I make the spiral blade in sections, which may be easily handled. These sections or plates 12 may be made in any desired way, as by casting them of metal or by pressing them into shape, and are provided with lugs or projections 15 and 16, which have holes in them adapted to receive rivets or bolts. These plates are made of a proper width and shape to fit the inner core 13 and the outer shell 11 and are suitably secured to the same. The edges of the plates are provided with interlocking lips 17, the upper lip of one plate fitting into the under lip of the succeeding plate. This construction is clearly shown in Fig. 1, where, as shown at C, just below the floor 50 one of the plates has not been secured in position. These plates are formed so that when placed end to end, as shown, their respective surfaces will form a continuous spiral surface of the proper pitch for the conveyer. The pitch may of course be varied according to the design and purpose of the chute.

If desired, the inner core may be omitted and the packages guided in their descent by means of the flange 19. (Shown in Fig. 3.) This flange may be continuous and connected to a spiral comprising a single blade; but I have herein shown it made up of sections connected to the inner ends of the plates 12'. Centrifugal force tends to keep the parcels which are descending through the chute to the inner wall of the outer shell 11, and therefore the danger of their falling through the inside of the chute is reduced to a minimum. The inner core could therefore be omitted entirely; but packages may fall inside if there should be overcrowding, and I prefer, therefore, to provide the spiral with the inner spiral flange or raised portion 19.

The flange 19 may, if desired, be made of sufficient height to meet the inner end of the plate immediately above it. Thus, in effect, the flanges would form an inner core. This construction is shown in Fig. 4, where 19' designates such flange extensions to form an inner core. These extensions may be secured in place or to each other in any desired manner.

The outer shell could also be made up of sections which would virtually be extensions of outer flanges of the plates. This latter construction is not shown, as it is deemed a poor one.

Fig. 4 shows only two floors 30 and 40, also an exit-opening 21, a guiding-plate 29', and a platform 23.

Without limiting myself to any of the details or arrangement of parts herein disclosed, what I claim, and desire to have protected by Letters Patent of the United States, is—

1. The combination with a spiral blade in sections, of a sectional interior wall for said spiral blade, and an outer wall for the same.

2. The combination with a spiral blade in sections, of a sectional core, and an outer wall for the spiral surface.

3. The combination with a spiral blade composed of plates with interlocking lips, vertically-extending portions on said plates to form an interior wall for the spiral surface, and an outer wall for the spiral.

4. A spiral gravity-conveyer comprising a spiral blade composed of plates having interlocking lips, projections on the inner ends of said plates to form an inner wall for the conveying spiral, and a casing inclosing said spiral blade.

5. The combination with an outer casing, of a spiral blade composed of plates with interlocking lips on their edges, vertically-extending projections on the inner ends of said plates to form an inner spiral wall for the spiral blade, and means for securing the plates to the outer casing.

6. The combination with a sectional spiral blade, of a sectional inner core, and an outer shell.

7. The combination with a spiral blade made up of a plurality of plates, additional plates at the inner ends of said first-named plates to form an inner core, and a casing for the spiral blade.

8. The combination with a spiral blade composed of formed plates, of parts extending vertically from the inner ends of said plates to form an inner core, and an outer shell for the blade.

9. The combination with an outer shell, of a spiral blade having a continuous surface and being composed of formed plates attached to the outer shell, and raised portions on the inner ends of said plates.

10. In a spiral gravity-conveyer, the combination with an outer shell, of a spiral blade composed of formed plates attached to the outer shell, and upwardly-extending members at or near the inner ends of said plates to form a guiding-wall for the conveyer.

In testimony whereof I have signed my name to this specification in the presence of two subscribing witnesses.

MARTIN C. SCHWAB.

Witnesses:
S. L. SCHULLER,
CHAS. H. SEEM.